United States Patent Office 3,510,543
Patented May 5, 1970

3,510,543
VINYL CHLORIDE POLYMER MIXTURE FOR THE PREPARATION OF TRANSPARENT RIGID SHEETS
Gerhard Kühne, Burghausen (Salzach), and Erich Zentner, Burgkirchen (Alz), Germany, assignors to Farbwerke Hoechst Aktiengesellschaft vormals Meister Lucius & Brüning, Frankfurt am Main, Germany, a corporation of Germany
No Drawing. Filed Oct. 22, 1965, Ser. No. 502,542
Claims priority, application Germany, Oct. 24, 1964, F 44,308
Int. Cl. C08f 29/24, 15/06
U.S. Cl. 260—876                  7 Claims

ABSTRACT OF THE DISCLOSURE

A composition of matter consisting essentially of:
(a) about 50–70% by weight of a homopolymer of copolymer of vinyl chloride with another vinyl compound copolymerizable therewith, the reaction being effected in aqueous emulsion, the resulting material having a K-value of 58–72;
(b) about 10–30% by weight of a homopolymer of vinyl chloride prepared in aqueous suspension and having a K-value of 50–65;
(c) about .5–40% by weight of a cross-linked graft copolymer of vinyl chloride wherein said vinyl chloride is grafted on a copolymer of a conjugated diene with acrylonitrile or methacrylonitrile, said graft copolymer being essentially insoluble in organic solvents and having a gel content of at least 90%; and
(d) 0% or 1–10% by weight of a cross-linked elastomeric copolymer prepared by emulsion polymerization of a conjugated diene and acrylonitrile or methacrylonitrile in an aqueous emulsion, said elastomeric copolymer having a gel content of at least 80%;
and rigid sheets produced from said composition of matter suitable for packing foodstuffs.

---

The present invention provides a polymer mixture for the preparation of rigid sheets.

The known rigid sheets prepared from emulsion homo- or copolymers of vinyl chloride are translucent and suitable for deep-drawing and have good strength properties but their toughness and shock resistance at low temperatures (cold flexibility) are not sufficient for many fields of application. Rigid sheets prepared from polyvinyl chloride which has been modified with an elastomer are resistant to impact and shock resistant at low temperatures but they are not very suitable for deep-drawing and, besides, their transparency which is impaired by the presence of emulsifiers does not comply with the requirements which transparent packing materials have to satisfy today. The transparency can be improved by the complete or partial removal of the emulsifier after the preparation of the sheets or by the use of special emulsifiers but sheets prepared from such polymers are not substantially different in their mechanical properties from the sheets prepared from the starting material.

The suspension homo- and copolymers based on vinyl chloride, which are free from emulsifiers, also yield rigid sheets which are satisfactory as far as their transparency and shapability are concerned but which are very brittle and not sufficiently shock resistant at low temperatures.

Copolymers of vinyl chloride with esters of acrylic, fumaric or itaconic acid yield tough sheets but the shock resistance at low temperatures, the deep-drawing properties, transparency and thermal stability under load of these sheets are not sufficient.

Attempts have also been made to obtain sheets having the required combination of the above-mentioned physical properties from mixtures of different polymers, so-called polyblends. For this purpose mixtures of emulsion or suspension polymers of vinyl chloride or emulsion or suspension copolymers of vinyl chloride with vinyl acetate, esters of acrylic, itaconic, maleic or fumaric acid and styrene or of graft polymers or acrylic or methacrylic acid esters and elastomers, for example, copolymers of butadiene with acrylonitrile and/or chlorinated polyolefins have been used. None of the numerous polyblends used for the aforesaid purpose yields rigid sheets having all of the required physical properties.

Polymer mixtures of the aforesaid kind which come into contact with foodstuffs can only be stabilized—just as the rigid sheets based on suspension homo- or copolymers or vinyl chloride—by means of the expensive octyl tin compounds which in addition to being expensive are admitted for the packing of foodstuffs in certain countries only.

Sheets based on emulsion polymers of vinyl chloride can in most cases be stabilized in accordance with the foodstuff laws, by means of cheap organic compounds such as diphenyl thiourea. However, the thermostabilizing effect of compounds of this kind is limited, so that it is, for example, not possible when using such compounds to apply the elevated temperatures which are necessary to improve the transparency of the sheets. Attempts have therefore been made to use other and/or additional stabilizers, for example, epoxidized oils or organotin compounds. The addition of such substances has not yet enabled, however, the desired degree of transparency to be obtained in emulsion polymers.

Now we have found that a mixture of at least three and preferably four definite different polymer types can be transformed into rigid sheets which possess the above-mentioned physical properties to a very high degree.

The polymer mixture according to the invention for the preparation of rigid sheets comprises:
(a) An emulsion homo- or copolymer of vinyl chloride having a K value within the range of 58 to 72, preferably 58 to 60;
(b) A suspension polymer of vinyl chloride having a K value within the range 50 to 65, preferably 50 to 55;
(c) A cross-linked graft copolymer of vinyl chloride which has been prepared by the emulsion polymerization process and in which the vinyl chloride is grafted on a copolymer of a conjugated diene and acrylonitrile or methacrylonitrile, the graft copolymer being insoluble in organic solvents and having a gel content of more than 90% (determined by extracting for 8 hours with toluene in a Soxhlet apparatus and subsequently drying, the method having been described in J. Polym. Science 3, 1948, page 576).

The mixture may advantageously contain as a further component:
(d) A cross-linked elastomeric copolymer which has been prepared by the emulsion polymerization process from a conjugated diene and acrylonitrile or methacrylonitrile, the elastomeric copolymer being insoluble in organic solvents and having a gel content of more than 80%.

As monomers that may be copolymerized with vinyl chloride to yield the aforesaid component (a) there may be used vinylidene chloride, organic vinyl esters of caroxylic acids, for example, vinyl acetate or vinyl propionate, esters of acrylic, methacrylic, maleic, fumaric or itaconic acid and straight-chain or branched alcohols having 1 to 10 carbon atoms. As conjugated dienes for the preparation of components (c) and (d) there may be used, for example, butadiene, chloroprene and methyl butadiene. Cross-linked mixing components (c) and (d) are insoluble in organic solvents such as aliphatic or aromatic hydrocarbons or chlorinated hydrocarbons and aromatic ketones.

The proportions in which the three or four components are present in the polymer mixture according to the invention may vary within certain limits. A very favourable combination is one comprising 50 to 70% by weight of component (a), 10 to 30 % by weight of component (b), 0.5 to 40% by weight of component (c) and 1 to 10% by weight of component (d), the percentages being calculated on the total mixture.

The three or four components of the polymer mixture may be prepared separately by one of the known suspension or emulsion polymerization processes (cf. Schildknecht, "Vinyl and Related Polymers," John Wiley and Sons Inc., New York, 1952, page 385 et seq.) and then be mixed with one another in known manner. By the process described in Belgian Pat. 629,046 which coincides with U.S. Pat. 3,281,345 a mixture containing components (a) and (c) or components (a), (c) and (d) may be prepared.

In order to obtain sheets having a particularly good transparency from the polymer mixture according to the invention, components (a), (c) and (d) are prepared with the use of so small an amount of emulsifier that the resulting sheet contains no moe than about 1% of emulsifier.

The polymer mixture according to the invention can be stabilized by the addition of known stabilizers. An excellent sheet which is suitable for use in the foodstuff industry can be prepared from a mixture which as stabilizers contains 0.1 to 1 % by weight, calculated on the mixture, of diphenyl thiourea or α-phenyl indole, 0.5 to 5% by weight, calculated on the mixture, of epoxidized natural vegetable or animal oils containing at least 6% of oxirane groups and having an iodine number below 8, and about 0.2% by weight, calculated on the mixture, of sodium carbonate or another alkalizing water-soluble salt such as sodium acetate, sodium ortho phosphate, sodium pyrophosphate or sodium adipate.

The polymer mixture according to the invention may also be stabilized with other compounds, for example, with other epoxy compounds than those mentioned alone, with organotin compounds, salts of heavy metals and fatty acids or mixtures of aminocrotonic acid esters, preferably those of 1.4-butylene-glycol or fat alcohols having 12 to 18 carbon atoms, said esters containing 10 to 15% of free fat alcohols.

tan waxes, amide waxes, higher fatty acid esters or polyolefins may be added to the mixtures.

In view of the experience hitherto made in the preparation of rigid sheets it was not to be expected that a very transparent rigid sheet having good strength properties, a good toughness, a good shock resistance at low temperatures and excellent deep-drawing properties could be prepared from the mixture according to the invention which comprises three or four different types of emulsion and suspension polymers. It was also surprising that despite the relatively large proportion of a suspension polymer a stabilization could be brought about by means of diphenyl thiourea in combination with epoxidized natural oils, for example, soybean oil, although such a stabilization is ineffective in pure suspension polymers.

For comparison purposes three known mixtures and the mixture according to the invention were processed into sheets. For this purpose four batches (mixtures 1, 2, 3 and 4 indicated in the table given below) were mixed in known manner, without heating, gelatinized and homogenized on a known plastificator, for example, a heated internal mixer, a kneader, a mixing extruder or mixing rolls, and processed into sheets of uniform thickness on a commercially available calendar comprising 3 to 5 rolls arranged in desired disposition. In each case the working conditions (temperature and speed of rolling) that were most favourable for the batch to be processed were used. The physical properties of the products obtained in this manner are indicated in the lower part of the table. Mixtures 1, 2 and 3 were prepared according to the prior art while mixture 4 was prepared in accordance with the invention.

The following components were used for the preparation of the mixtures indicated in the table:

Component a:
 An emulsion polymer of vinyl chloride having a K value of 60 (prepared by the emulsion polymerization of vinyl chloride, cf. C. A. Schildknecht, "Vinyl and Related Polymers," New York, 1952, page 395 et seq.).

Component b:
 A suspension polyvinyl chloride having a K value of 55 (prepared by the suspension polymerization of vinyl chloride, cf. C. A. Schildknecht, "Vinyl and Related Polymers," page 393 et seq.).

Component c:
 A graft copolymer of vinyl chloride in which the vinyl chloride is grafted on a copolymer of butadiene and acrylonitrile, the graft copolymer having a gel content of 96% (prepared by the process described in U.S. Pat. 3,281,345. The graft copolymer is obtained, for instance, by polymerizing in an aqueous emulsion a mixture of vinyl chloride and 1 to 20 percent by weight of at least one other compatible monomeric vinyl compound until 60 to 85% of the monomer is polymerized, then mixing the emulsion so obtained and containing unreacted vinyl chloride with a latex having as an essential ingredient an elastomeric polymer selected from the group consisting of a polymer of butadiene, isoprene, a high conjugated diene and mixtures of said dienes and monomeric vinyl compounds wherein the portion of the diene is at least 75%, and polymerizing the mixture so obtained until 90 to 95% of the vinyl monomer is polymerized.

Componet d:
 An elastomeric copolymer of butadiene and acrylonitrile which is insoluble in organic solvents and has a gel content of 90% (prepared, for example, in the manner described in "Rubber Age," volume 54, 1943, pages 299, 336).

The mixture of components (a), (c) and (d) was prepared in the manner described in Belgian Pat. 629,046.

The K value according to Fickentscher (cf. C. A. Schildknecht, page 35 of the above-mentioned book) was determined by the method of Hoeppler.

The sheet prepared from batch 1 had a good strength and a good shock resistance at low temperatures but only mediocre deep-drawing properties and a mediocre impact strength and was only translucent. The sheet obtained from batch 2 could practically not be used for deep-drawing. Batch 3 yielded a sheet which was very transparent and had a good strength but only mediocre deep-drawing properties and, besides, it was little resistant to shock at low temperatures and very little impact resistant. The sheet according to the invention which had been prepared from batch 4 was very transparent and distinguished by a good impact strength, good strength properties, a good shock resistance at low temperatures and excellent deep-drawing properties and could be used for the packing of foodstuffs.

|  | Mixture or sheet 1 (for comparison) | Mixture or sheet 2 (for comparison) | Mixture or sheet 3 (for comparison) | Mixture or sheet 4 (according to the invention) |
|---|---|---|---|---|
| Component (a) | 100 | | | |
| Components (a) plus (c) plus (d) | | | | 70 |
| Component (b) | | 100 | 100 | 30 |
| Diphenyl thiourea | 0.5 | 0.5 | | 0.5 |
| Di-n-octyl tin-bis-thioglycolic acid octyl ester | | | 1.5 | |
| Epoxidized soybean oil | 2 | 2 | 2 | 2 |
| Thermostability of the batch, rolling test at 180° C., minutes | 20 | 5 | 40 | 30 |
| Turbidity number (determined according to DIN Specification No. 53490) | 230‰ | 230‰ | 15‰ | 15‰ |
| Colour of the sheet | (1) | (2) | (3) | (3) |
| Tensile strength (determined according to DIN Specification No. 53371), kg./cm.² | 500 | (4) | 500 | 500 |
| Elongation at break (determined according to DIN Specification No. 53371), percent | 50 | (5) | 20 | 50 |
| Impact tensile strength (determined according to DIN Specification No. 53448), kg./cm.² | 420 | 100 | 350 | 480 |
| Shock resistance at low temperatures+, ° C | −10 | +10 | +5 | −10 |
| Deep-drawing behaviour ++ tolerance of processing, seconds | 8-11 | 10-12 | 10-12 | 6-12 |

¹ Translucent, light.
² Reddish brown discolouration.
³ Very transparent, light.
⁴ In homogeneous.
⁵ Not measurable.
+Determined by the loop drop hammer test.
++Drawing ratio h:d=1:1.5.

NOTE—All of the batches contained 2% of montan wax as a lubricant.

We claim:
1. Composition of matter consisting essentially of:
(a) about 50–70% by weight of a homopolymer of vinyl chloride, said homopolymer being prepared by polymerization in an aqueous emulsion and having a K-value of 58–72;
(b) about 10–30% by weight of a homopolymer or copolymer of vinyl chloride and another vinyl compound copolymerizable therewith, said homopolymer or copolymer being prepared by polymerization in an aqueous suspension and having a K-value of 50–65; and
(c) about .5–40% by weight of a cross-linked graft copolymer of vinyl chloride obtained by polymerizing in an aqueous emulsion a mixture of vinyl chloride and 1–20 percent by weight of at least one other compatible monomeric vinyl compound to effect polymerization of 60–85% of the monomer; mixing the resulting products and reactants with a latex having as an essential ingredient an elastomeric polymer selected from the group consisting of a polymer of butadiene, isoprene, a higher conjugated diene, and a mixture of at least 75% dienes and monomeric vinyl compounds; and polymerizing the mixture to effect 90–95% conversion of the vinyl monomer; the resulting graft copolymer being essentially insoluble in organic solvents and having a gel content of at least 90% and
(d) from 0% to 10% by weight of a cross-linked elastomeric copolymer prepared by emulsion polymerization of the conjugated diene and acrylonitrile or methacrylonitrile in an aqueous emulsion, said elastomeric copolymer having a gel content of at least 80%.

2. Composition of matter according to claim 1, containing up to 1% by weight, calculated on the composition, of an emulsifying agent.

3. Composition of matter according to claim 1, containing additionally as stabilizing compounds 0.1 to 1% by weight, calculated on the composition, of diphenyl thiourea or α-phenyl indole, 0.5 to 5% by weight, calculated on the composition, of epoxidized natural oils having at least 6% oxirane groups and an iodine number of below 8 and 0.1 to 0.4% of sodium carbonate.

4. A rigid sheet manufactured from a composition of matter according to claim 1.

5. Composition of matter according to claim 1 containing a lubricating agent consisting of a wax, fatty alcohol, fatty acid ester or mixture of the wax with the ester.

6. Composition of matter according to claim 1 wherein the (a) component has a K-value of 58–60 and the (b) component has a K-value of 50–55.

7. Composition of matter according to claim 1 containing a stabilizing compound selected from the group consisting of an epoxy compound, organotin compound, heavy metal salt of fatty acid, and a mixture of amino crotonic acid esters and fatty alcohols.

References Cited

FOREIGN PATENTS 629,046   8/1963   Belgium.

OTHER REFERENCES

M. Kaufman (Editor) Advances in PVC Compounding and Processing. London, MacLauren & Sons, 1962, TP 986. V48K3 (pages 5 and 6 relied on).

MURRAY TILLMAN, Primary Examiner

K. E. KUFFNER, Assistant Examiner

U.S. Cl. X.R.

260—899